Fig.6.

June 22, 1948. J. E. POINTON ET AL 2,443,868
TRANSPORTING GOODS FROM CHOCOLATE
COATING OR LIKE MACHINES
Filed Oct. 27, 1942 10 Sheets-Sheet 9

Fig. 8.

Inventors
J. E. Pointon
A. S. Tunley
By Haswell Downing Smith
Attys

Patented June 22, 1948

2,443,868

UNITED STATES PATENT OFFICE 2,443,868

TRANSPORTING GOODS FROM A CHOCOLATE COATING OR LIKE MACHINE

John Edward Pointon and Allan Ashmead Tunley, Peterborough, England, assignors to Baker Perkins Limited, Peterborough, England Application October 27, 1942, Serial No. 463,554
In Great Britain October 13, 1941

6 Claims. (Cl. 107—7)

This invention relates to machines or plant for transporting sweetmeats, biscuits or other goods from a chocolate coating or enrobing machine. The invention may also be applied to receiving biscuits and the like from an oven and transporting such for further treatment and/or for packing. The invention has more particular reference to that type of plant in which the goods are automatically delivered to flexible sheets or plaques, while the latter are progressively brought up over a knife edge or nose at the feeding or supply end of the machine and subsequently conveyed through a cooling stage by an endless tray conveyor on trays on which the plaques are supported, the goods after having passed through the cooling stage being delivered on to a packing or receiving conveyor from the plaques as they are drawn downwardly over a discharging knife edge or nose.

An aim of the present invention is to provide a simplified plant and improvements calculated to lower production costs and increase reliability of operation. A further aim of the invention is to provide for the mechanical handling of the plaques in such a way that soiling of the machine parts from chocolate or other debris is reduced to a minimum and the plaques themselves are preserved and kept as clean as possible.

According to the invention the plaques are supported flat upon trays travelling face upwards from the delivery position to a packing band, to a position adjacent the feed end of the machine where they leave the trays and travel by a separate path during loading, limited substantially to the requirements of cleaning and loading.

The invention consists in a cycle of mechanical operations comprising traversing plaques along a decorating or loading table support while receiving goods, engaging the heads of loaded plaques with trays fed in succession under the plaques as they proceed from the chocolate feeding position, passing the trays with their plaques on a circuitous path through a cooler, separating the trays from the plaques and bending the latter downwardly to discharge the goods, returning the stripped plaques to empty trays, passing the trays with their emptied plaques face upwards back to the feeding position where the plaques are disengaged from the trays and pulled therefrom in an inverted position, and drawing the plaques upwardly at the feed end of the machine and along the table to receive a fresh load.

The plaques may be flexible paper aprons such as employed for receiving chocolate coated goods from an enrober or they may be flexible sheets of any material suitable for the purpose to which the invention is applied. For example in certain cases the plaques may be of canvas or of flexible wire mesh.

According to one suitable form of the invention the direction of travel of the trays is reversed at the feed or loading end and at the delivery end of the plant while the plaques are removed to enable them to be flexed in passing them into the loading position in the one case and for discharging their load in the other.

In transferring the plaques to the loading table they are driven by tractor chains while during delivery of the plaque loads they are parted from their trays and driven by external means (which may include rotary disc or like means and cam or guide slots) until the trays take charge of them again for return to the feed end of the machines.

At the feed end of the machines where the plaques leave the trays the plaques may be inverted and in this position subjected to cleaning means.

At one or more points in the travel of the loaded trays, automatic means, adjusted by the passage of the trays, are provided for centring the plaques laterally on their trays. For example, at the feed and delivery ends of the circuit where plaques are being replaced on to the trays, automatic means, adjusted by the passage of the trays, are provided for centring the plaques laterally, prior to final engagement of the holding means.

In the preferred mode of delivering the plaque loads the trays are withdrawn from under the plaques while the plaques are flexed over a fixed nose to discharge their load.

In order to allow the heads of the plaques to pass between the fixed nose and a packing or receiving conveyor band, the latter is made displaceable preferably by tilting out of and into the receiving position.

In the accompanying drawings:

Figures 1, 1a and 1b together diagrammatically illustrate in elevation a plant according to the invention, Figures 2, 2a and 2b together show a corresponding plan.

In these drawings it will be noted that the trays and driving lugs are shown in the best positions to illustrate operations and are not necessarily in correct relative positions.

In carrying the invention into effect according to one convenient mode as applied to a machine or plant for the cooling of chocolates or chocolate coated goods (hereinafter referred to as chocolates) as they pass from an enrober, a decorating or receiving table 1 comprising a sheet metal surface over which the plaques are adapted to be slid is mounted in side frames 100 adjacent the discharge end of the enrober or chocolate coating machine of known form, the discharge end of which is represented by the conveyor 2. At the enrober end of this table a shaped metal bar or nose 3 over which the plaques are drawn on to the table is mounted on a support 3a. This nose 3 is connected to mechanism adapted to reciprocate it in synchronism with the arrival and passage of the heads of plaques as they are drawn upwardly on to the decorating table 1, so that in effect the nose 3 acts as a sliding gate for admitting the head of the plaque and when closed, leaves just sufficient clearance for the paper of the plaque to pass. For this purpose the nose is coupled by arms 101 to a reciprocating bar 4 which is connected at its ends by rods 5 to bell crank levers 6 which are oscillated by rotary cams 7 driven by gearing 8 and 102, from tray chains 9 by sprockets 103. The nose 3 and table 1 are provided with co-operating prongs 10 to present a continuous supporting surface for the plaques.

Figure 1:
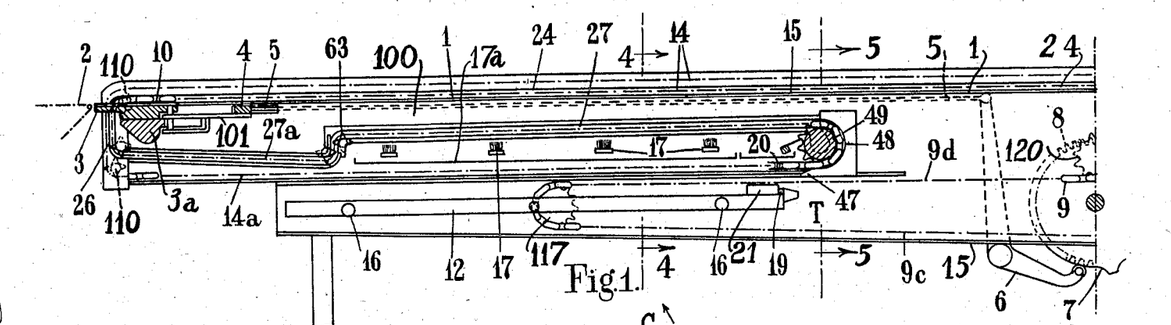
Figure 5:
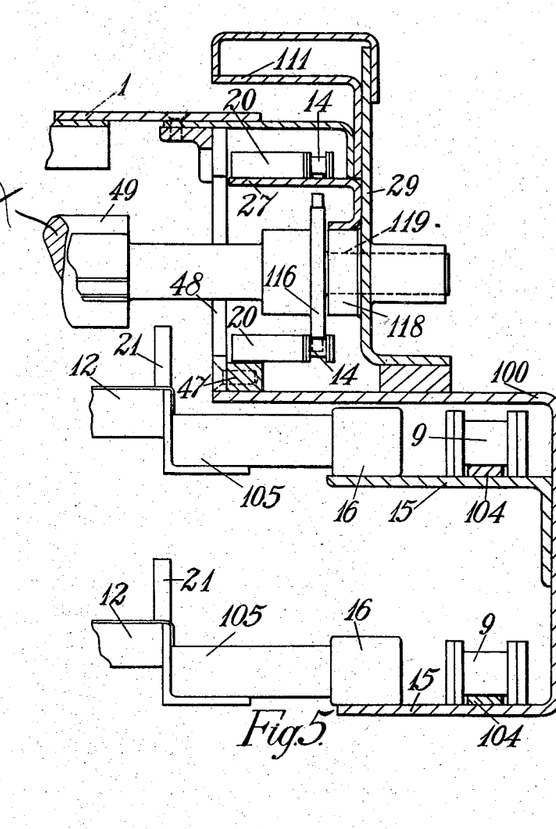
Fig. 5 is a partial cross sectional elevation on the line 5—5 of Fig. 1, to a larger scale.
Figure 6:
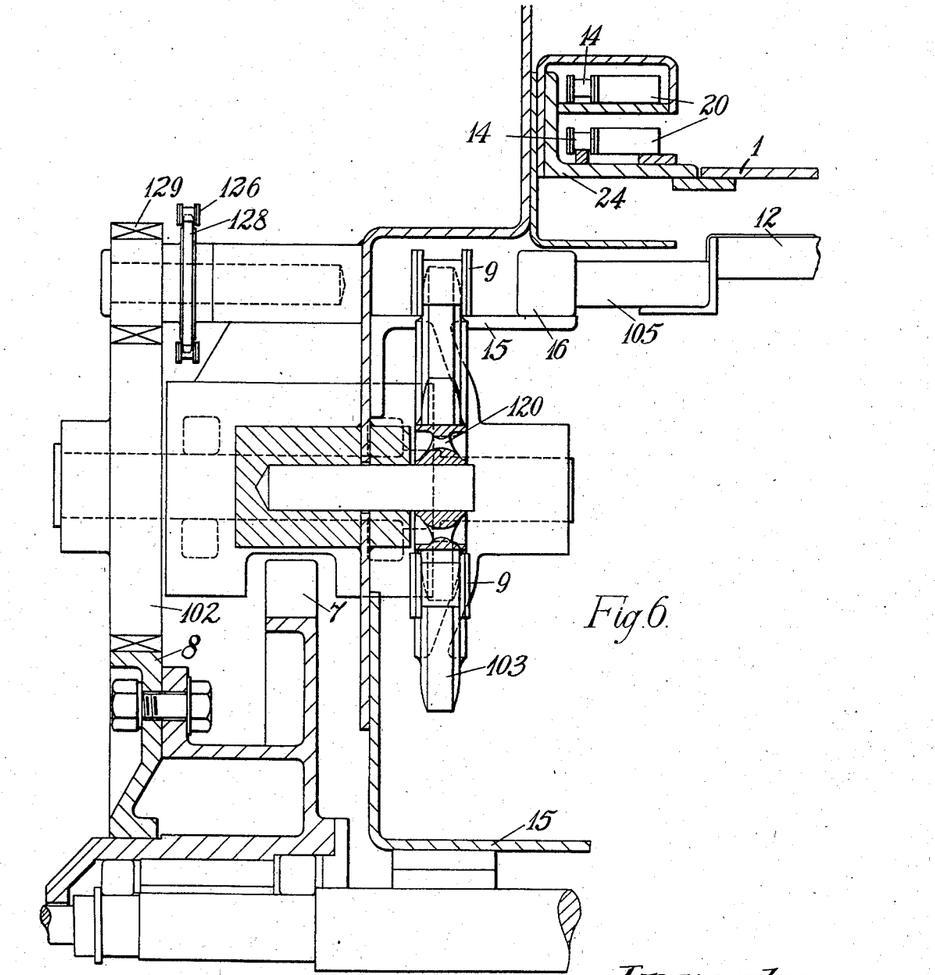
Fig. 6 is a partial cross sectional elevation on the line 6—6 of Fig. 1a, to a larger scale.
Figure 7:
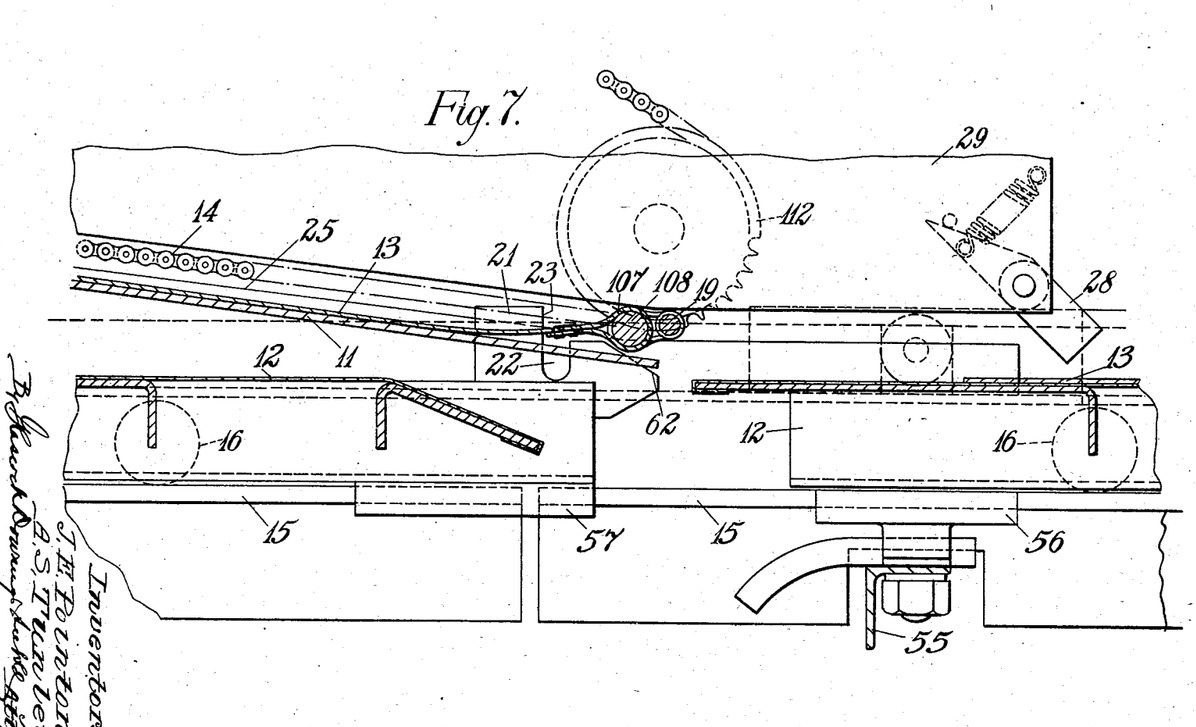
Fig. 7 is an enlarged scale elevation of the upper part of Fig. 1a, Fig. 8 is an enlarged scale elevation of the discharge zone of Fig. 1b.
Figure 8:
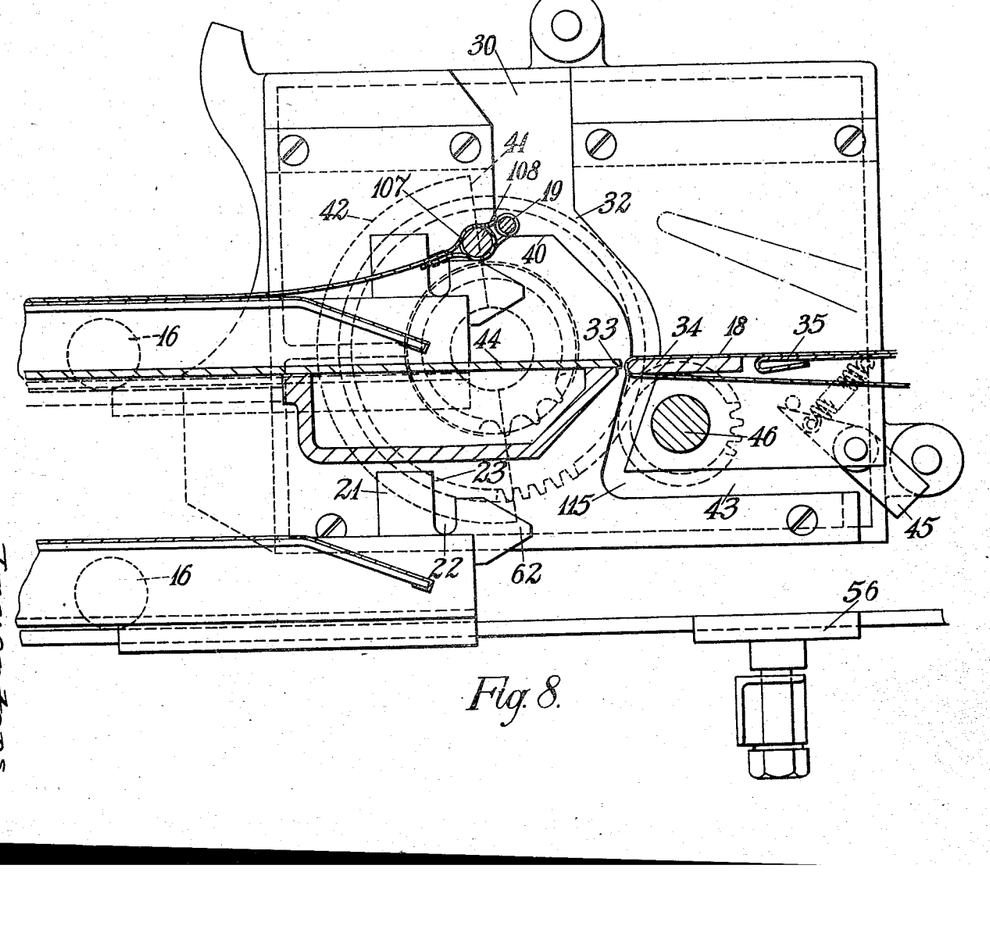
Figure 9:
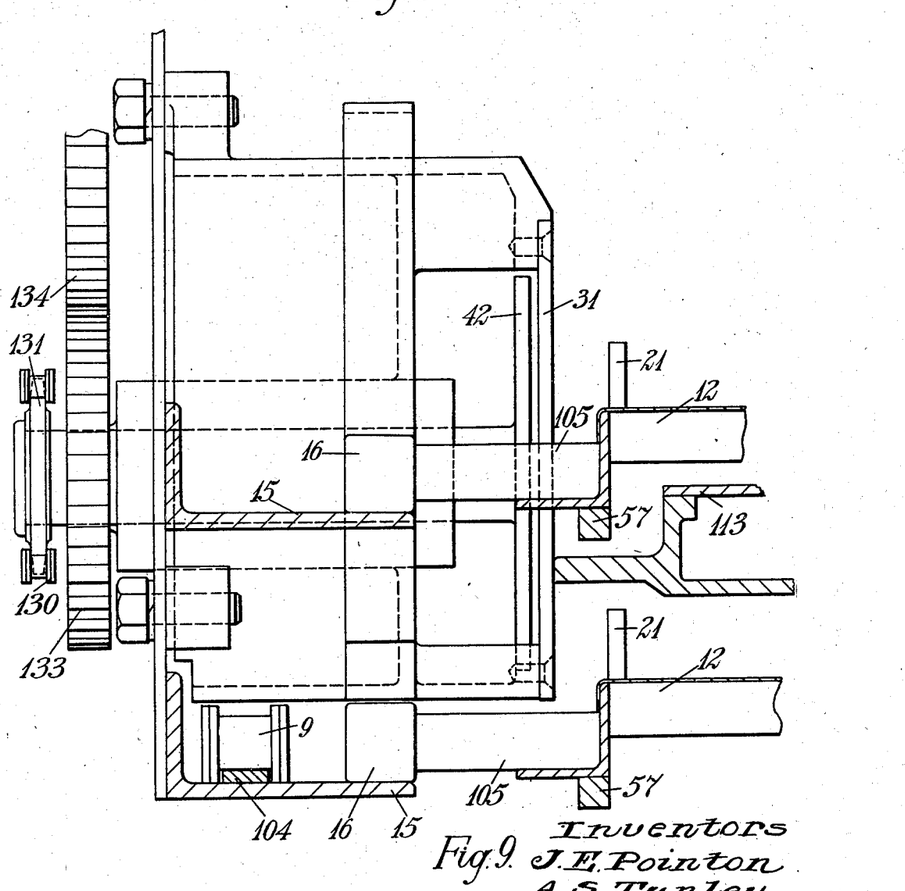
Fig. 9 is a partial cross sectional elevation corresponding to Fig. 8, Figs. 10 and 11 are enlarged scale elevation and plan of plaque centering means.

The decorating table 1 may be of sufficient length conveniently simultaneously to accommodate two plaques or, if desired, it may be longer. The further end of the table preferably has a downward incline 11 (see Fig. 7) to guide the plaques 13 as they are transferred from the table to supporting trays or carriers 12. The plaques 13 when passing over the decorating table 1 are driven by a superposed chain 14 as will be described hereinafter. When the plaques 13 have been transferred from the table to the trays 12 they are carried thereby throughout the course of the trays until they arrive at the delivery position D, (Figs. 1b, 8 and 9) where the trays 12 and plaques 13 temporarily leave one another in order to enable the plaques to discharge their load. After discharging, the plaques 13 are returned to the trays 12 which carry them back to a position, which may be conveniently called the transfer station T (Figs. 1, 2 and 5), beneath the forward end of the decorating table 1, where the plaques again leave the trays in order to be drawn on to and over the decorating table.

Figure 1A:
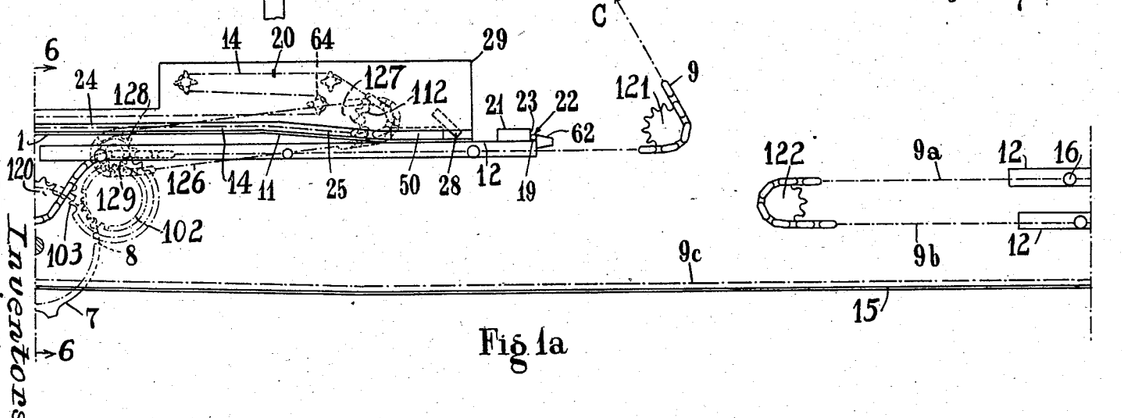
Figures 1B, 2B:
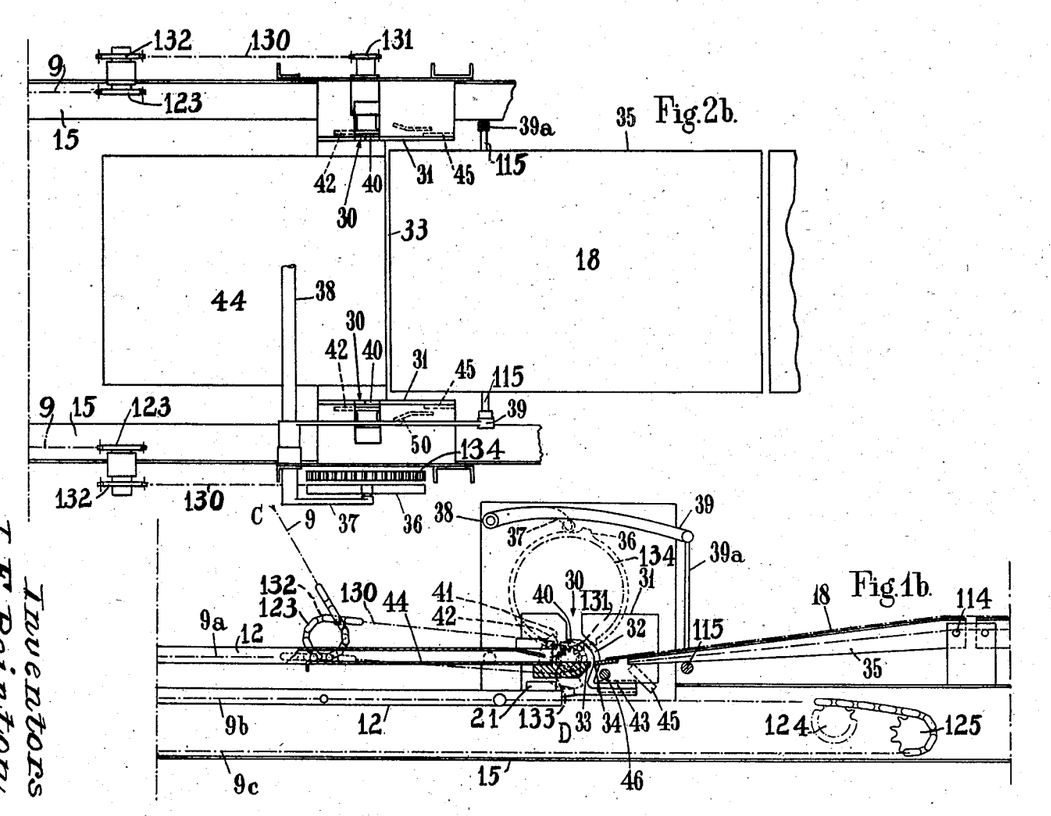
Figure 2:
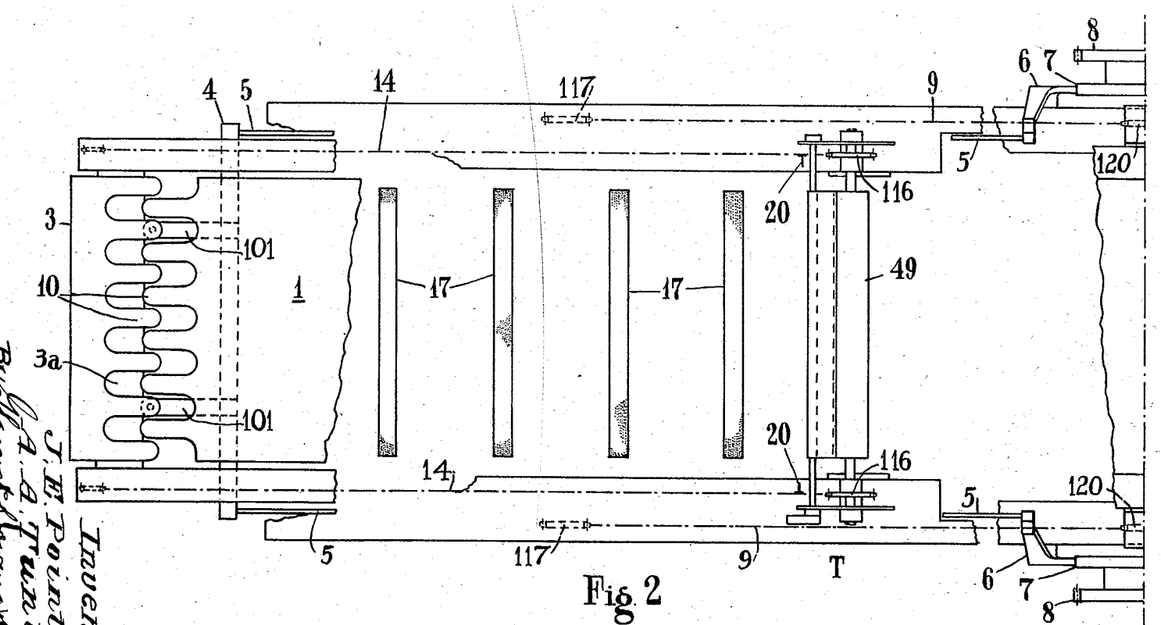
Figure 2A:
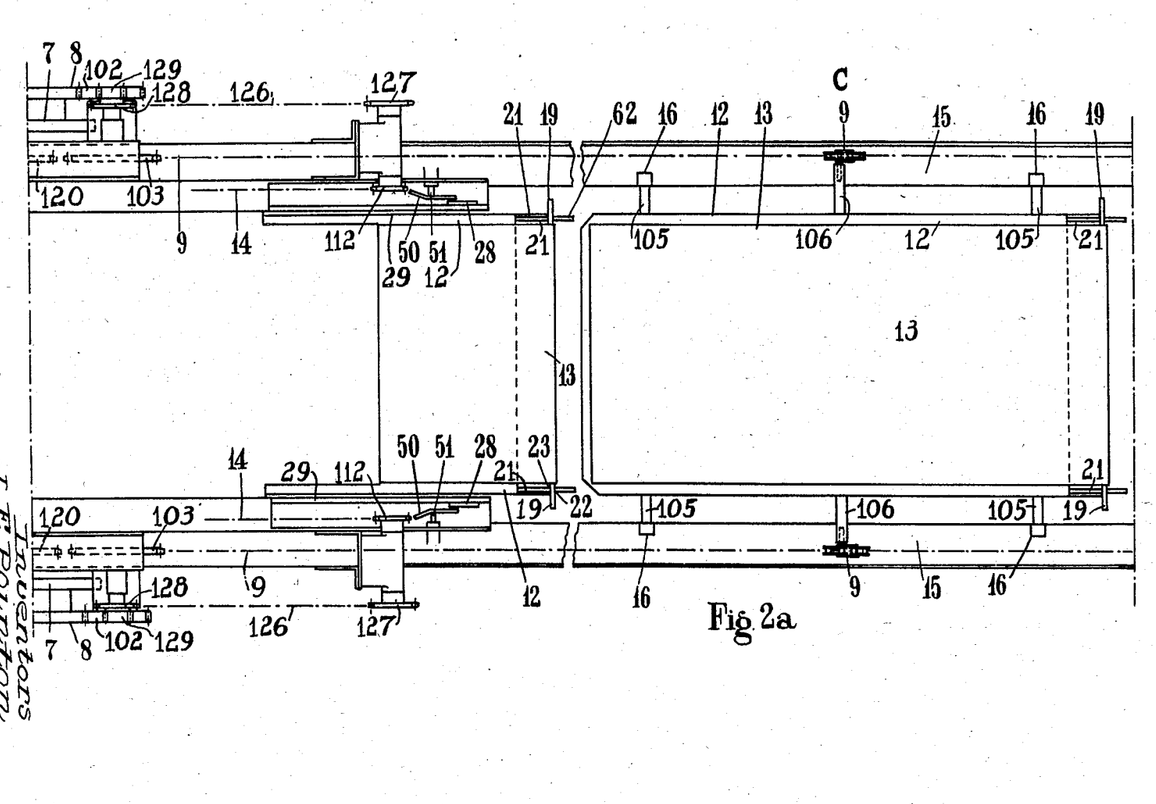
Figure 3:
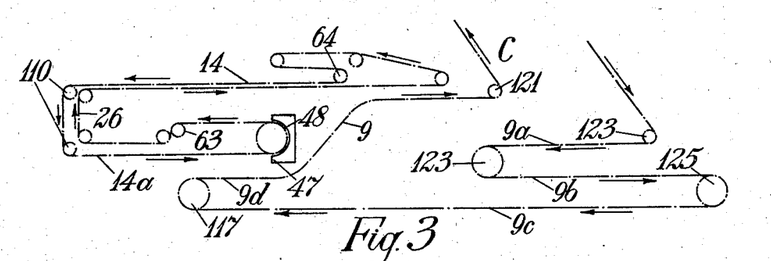
Fig. 3 is a diagram showing the circuits of the driving and transfer chains.
Figure 4:
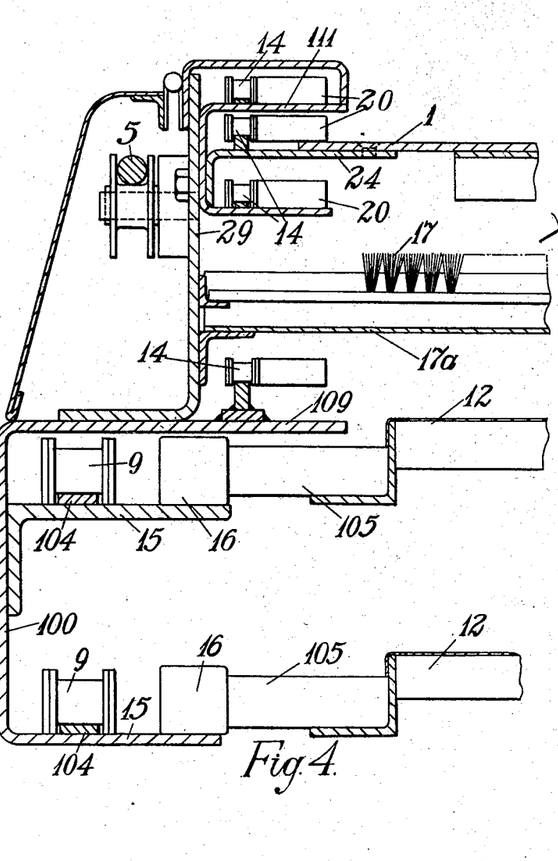
Fig. 4 is a partial cross sectional elevation on the line 4—4 of Fig. 1, to a larger scale.

Intermediate the position at which the trays receive the plaques (which may be referred to as the plaque receiving station) and the delivery end of the machine the trays and their plaques pass on a circuitous or to-and-fro course through a cooler of known form represented diagrammatically at C (Figs. 1a, 1b and 3).

The trays 12 comprise plates or frames which at their sides are attached to traction chains 9, guide rails or supports 15 being provided adjacent the chain track 104 throughout its course, or where necessary, with which guide rollers 16 located on arms 105 at the side of the trays 12 engage to maintain the level travel of the trays. The connection between the chains 9 and the trays 12 may be at the mid point 106 of the trays (see Fig. 1) while towards the ends of the trays the guide rollers 16 are positioned. Beneath each tray 12 and towards each side and at the forward end thereof a centering rail 57 (see Figure 10) is fixed, the operation of which will be described later.

The chain 9 traverses a course (see Fig. 3) which passes horizontally under the inclined portion 11 of the decorating plate 1 and subsequently passes upwardly into the cooler C, where it travels upwardly and then lap upon lap downwardly in known manner towards the discharge position or lap upon lap upwardly and then downwardly toward the discharge position. On approaching the discharge position D the trays 12 may be lowered whilst maintaining their level on an inclined path. At the delivery position the chains 9 turn backwardly at 9a towards the feed end of the machine in a loop which again brings the chains on a forward track 9b underneath the delivery position and under or partly under the packing band 18 which receives the goods as delivered from the plaques. After passing for a short distance under the packing band the track of the chains 9 is again turned downwardly and traverses a horizontal path 9c back to the feed end of the machine where, under the decorating table, the track takes an upward turn and passes horizontally at 9d for a short distance towards the delivery end of the machine to afford a convenient transfer station at which the plaques they carry may be drawn therefrom and transferred over the feed end or nose 3 of the table to its upper surface. It will be appreciated that there are traction chains 9 at both sides of the machine.

The plaques 13 (according to the application of the invention under description) comprise flexible sheets of paper of the known kind for receiving chocolates from an enrober and at their head are provided with loops 107 (Figs. 7 and 8) through which is threaded a rod 108 connected to a driving rod or bar 19. This driving rod 19 projects beyond the side margins of the plaque 13 for engagement with the driving and guide means which at one time during their course of travel comprise the superposed chains 14 and supporting and guiding tracks or channels 24, 25, 26, 27, 27a, 109 and 111 for said chains, whilst through the main portion of their course the driving rods 19 are engaged by means provided for their reception at the forward end of each tray 12. The superposed traction chains 14 are mounted with their laps in vertical planes at the sides of the plaque track adjacent the decorating table. At the feed end of the table adjacent the feed nose 3 the chains 14 are turned downwardly around guide sprockets 110 and traverse a path 14a parallel with and above the tray chain track 9d at the transfer station in order to engage the driving rods 19 and lift and draw the plaques over the feed nose on to the decorating table. The plaque driving chains 14 are provided with spaced lugs 20 having faces for engaging the projecting ends of the plaque driving rods 19. The chains 14 are driven by chains 126 and sprockets 127 and 128, the latter being driven by gear 129 from the gear 102.

The trays 12 at their forward ends are provided on each side with plaque driving-rod-engaging means (hereinafter called rod-engaging plates) which comprise vertical plates 21 having slots 22, the rear side of which is extended upwardly to form a rod-catching post or piece 23, while on the forward side a flat or inclined surface 62 is formed on which the ends of the driving rods may lie as referred to hereinafter. The ends of the rods 19 lie in the slots 22 when the plaques 13 are being pulled by the trays 12 and whilst the trays are carrying the plaques throughout most of the track. The ends of the rods are deposited on the flat or inclined part 62 at the transfer stations prior to sliding into the retaining slot.

The guide slot or track 24 is parallel with and slightly above the decorating table at each side thereof for receiving and guiding the ends of the plaque driving rods 19 while the plaques 13 are passing along the table 1 and these guide slots or tracks 24 are inclined downwardly at 25 to correspond with the downward inclination 11 at the delivery end of the decorating table. In the other direction the tracks 24 extend downwardly at 26 and along the plaque traction chains at 27a, 27 toward the transfer station T. As a plaque rod 19 passes down the inclined portions 25 of the tracks by the engagement of lugs 20 on the chains 14 it is followed by the catch posts 23 of a tray 12 which has risen and is proceeding forward along lap 9a to receive it (see Fig. 7). When the driving lugs 20 on the plaque traction chains 14 leave the driving rod 19 of a plaque in passing round the guide sprockets 112 at the turning point of the chains 14, the rod 19 is engaged by the posts 23 and is pressed into the slots 22 of the rod-engaging plates 21 by spring latches or fingers 28 pivoted on the side plates 29 which support the tracks of the chains 14. The rod 19 remains in the slots 22 throughout the travel of the plaque and tray through the cooler C.

At the delivery end of the machine, as a tray 12 and plaque 13 are lowered on the chains 9 from the cooler C the ends of the driving rod 19 of the plaque enter the open mouth 30 of vertical cam plates 31 (see Figs. 1b and 3) which have slots 32 curved to guide the rod 19 downwardly between the fixed delivery nose 33 of the table 44 and the extremity of the packing or receiving band 18 which at this point passes over a knife edge 34. In order to allow the rod 19 to pass between the nose 33 and band 18, the packing band 18 which is of the known endless conveyor kind, is mounted on a frame 35 which is pivoted at 114 at the side away from the delivery nose 33 so that the band as a whole may be tilted upwardly out of the way to afford the necessary gap for the passage of the plaque driving rods 19. This pivotal movement is effected by a rotary cam 36 engaging lever 37 on a rockshaft 38 which also carries arms 39 and links 39a coupled to a cross rod 115 located beneath the frame 35. When the knife edge 34 is in the receiving position the clearance between the packing band 18 passing over it and the delivery nose 33 is just sufficient to allow the paper plaque to pass through. As a tray 12 is lowered from the cooler path the ends of the plaque driving rod 19 drop into the open-mouthed cam slots 30 and temporarily rest on a shelf or ledge 40 until they are engaged by the edges 41 of mutilated rotary discs 42 disposed on either side of the machine and in planes adjacent to and parallel with the cam plates 31. The radial faces 41 of the mutilated portion of the discs strike the ends of the rods 19 and carry them off the ledges 40 and drive them downwardly along the curved cam slots 32 so that the plaques are flexed over the fixed delivery nose 33 the packing band 18 in the meantime having been raised. Beneath the delivery nose 33 the cam slots 32 have an elbow turn into a horizontal guide slot 43 from which they are drawn when the plaque is returned to a tray 12. The mutilated discs 42 are driven by chains and sprockets 130, 131 from sprockets 132 driven by the guide sprockets 123 of the tray chains 9. From one of the sprockets 131 a drive is imparted to the cams 36 by gearing 133, 134.

In the elbows 115 of the slots 32 the rods 19 are adapted to rest until they are caught up by the posts 23 on the driving plates 21 of one of the trays which is moving forward below the delivery nose 33 towards the turning point for return to the transfer station. Whilst the transfer of a plaque driving rod 19 to the delivery cam slots 32 is taking place its tray, on which the plaque has rested, recedes along the track 9a in a direction towards the feed end of the machine so that, in effect, whilst the driving rod 19 of the plaque is being passed downwardly and the head of the plaque is being pulled over the delivery nose 33 the tray is being withdrawn from under the plaque, allowing it to rest, while this is taking place, on a delivery table or plate 44 which lies as an extension in rear of the delivery nose 33. It will thus be seen that the trays 12 as they pass forwardly along the lap 9b of the chains 9 under the delivery nose 33 are empty and that each plaque 13 as it is stripped from one tray is returned to a tray in advance from which a plaque has been previously stripped.

As an empty tray passes along the lap 9b and under the delivery nose 33 its rod catching post 23 overtakes and propels the plaque rod 19 lying in the elbow 115 of the cam slot and pushes it along the straight guide portion 43 of the slot. At the end of the slot, spring-pressed fingers 45 are mounted which bear upon the plaque rod 19 as it leaves the straight portion of the slot 43 and depresses it into the slots 22 of the rod-engaging plates 21 of the tray. The tray in continuing its travel takes up the propulsion of the plaque rod 19 and draws the plaque under a rotary guide roll 46 on to itself so that it lies extended on its upper face. As the tray reaches its forward terminal turning point it is lowered on to the return lap 9c of the tray traction chains 9 and the tray and its plaque are returned (with the tail of the plaque foremost) to the feeding end of the machine and transfer station T.

When a tray arrives at the transfer station and is proceeding along the lap 9d in the direction of the delivery end of the machine and plaque-receiving station, the ends of its plaque rod 19 engage inclined ends or ramps 47 formed at the open mouths of the guide slots 48. These ramps 47 raise the rod 19 out of the slots 22 of the rod-engaging plates 21 causing the rod to seat on the top of the plates 21 whereby it is engaged by a pusher lug 20 on the plaque traction chains 14 which pass around sprocket wheels 116. The pusher lug 20 carries the rod 19 upwardly around roll 49 at the terminal turning point of the transfer extension of the chains 14, and into the guide slots 27. The guide slots 27, 27a lie substantially parallel with the laps 9d of the chains 9 at the transfer station and as the chains 9 travel round the terminal sprockets 117 the head of the plaque is carried on a reverse path around the roll 49 which causes the plaques to be inverted while they are being drawn towards the feed nose 3. At this position cleaning brushes or pads 17 located over trays 17a may be mounted so that the inverted faces of the plaques are drawn over them to remove surplus chocolate, crumbs or other debris. Below the feed nose 3 the chains 14 take an upward course through the path 26 around the feed end turning point on to the upper side of the decorating table. As the plaque rod 19 is about to be pushed into contact with the underside of the feed nose 3, the latter moves rearwardly under control of the cams 7 (that is to say in the direction of the delivery end of the table) and opens gatewise to allow the rod 19 to pass to the upper side of the table. The nose 3 immediately returns to its normal position and as the rod 19 is propelled along the upper side of the table 1 the plaque 13 is bent over the nose 3 and the rest of the body of the plaque is drawn through the clearance between the nose and the delivery end of the enrober wire or conveyor 2. The passage of the plaque is synchronised with the batching arrangements of the enrober 2 and as soon as the head of the plaque has passed over the feed nose the first row of chocolates is fed on to the plaque and the whole batch is laid on to the plaque as it is drawn along the decorating table.

The guide 27 is pivotally mounted about the axis of the roll 49 being secured to bosses 118 mounted on the shaft ends 119 of the sprockets 116 and roll 49 and may be adjusted together with guide sprockets 63 for the chains 14 relatively to the fixed lap 27a. This adjustment is made in conjunction with an adjustment of chain guide sprocket 64 for the purpose of timing the driving lugs 20 of the plaque chains 14.

In addition to the sprocket wheels 102 and 117, the chains 9 are provided with guiding or turning sprockets 120, 121, 122, 123, 124 and 125.

The chains are driven through power means applied at any convenient point or points in known manner.

It will be appreciated that at the turning points in the path of the chains 9 the supports for the tray rollers 16 will be cut away and guide means will be provided for maintaining the trays 12 level, all in a manner well known.

The engagement of the plaque rods 19 in the driving slots 22 on the trays 12 locates the plaques lengthwise upon the trays and means for centring the plaques transversely of the trays may be installed at one or more points in their path of travel throughout the plant. For example, as a plaque 13 leaves the decorating table 1 and is laid upon the tray which is proceeding forwardly underneath the table, laterally positioned means may be adapted to engage the plaque driving rod endwise and adjust its position transversely to centralize it on the tray.

Figure 10:
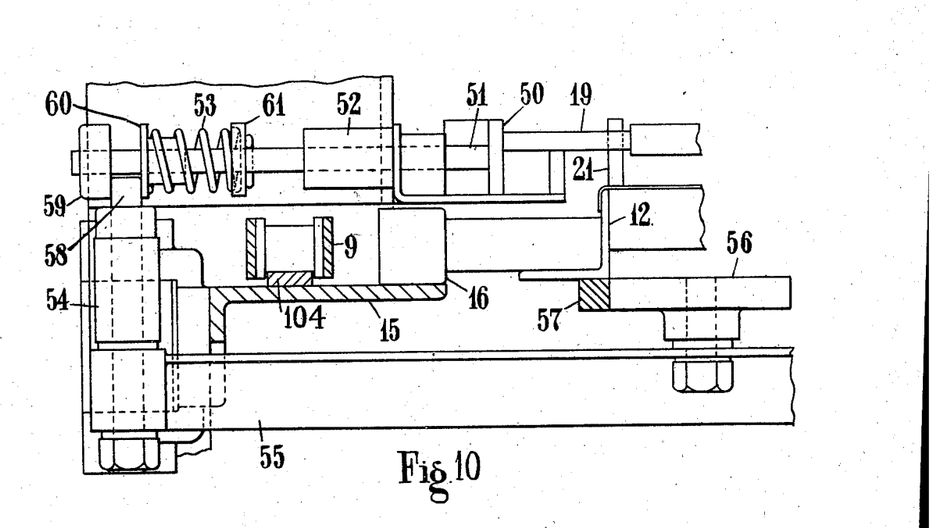
Figure 11:
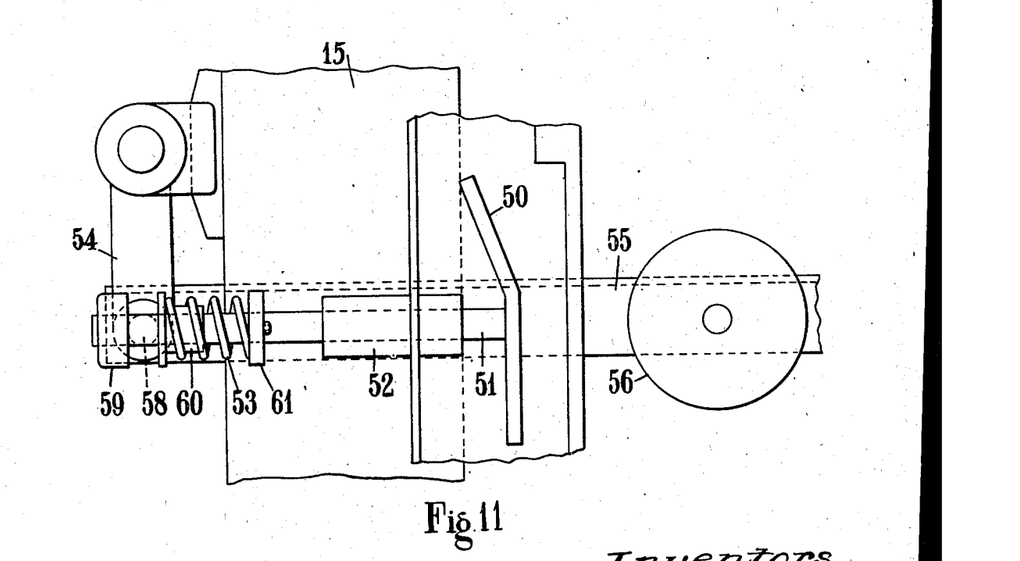

According to one form, see particularly Figures 10 and 11, a cam plate or flared guide 50 is mounted upon a transverse rod 51 adapted to be adjusted endwise in a guideway or bearing 52 so that the lateral position is determined at which it is brought to bear on the plaque rod 19 should the rod be asymmetrically disposed with respect to the tray 12 on its arrival at the cam plate position. The cam plate rod 50 is operated upon through a safety spring 53 by a pivoted adjusting lever 54, on which is carried a transverse slider 55 provided with a pair of rollers 56 which are mounted on a vertical pivot. These rollers are adapted to be engaged by the centring rails 57 on the tray 12 referred to hereinbefore. The lever 54 is provided with a pin 58 which lies between a collar 59 on the rod 51 and a sliding collar 60 with which one end of the spring 53 engages, the other end seating against a collar 61 fixed on the rod 51. The engagement between the rail 57 and the roller 56 causes the slider 55 to be adjusted and through the medium of the lever 54 the position of the cam plate 50 is correspondingly altered, as may be required to cause it to occupy the correct relative position with respect to the side of the tray to ensure centralisation of the head of the plaque by engagement of the rod 19 with the cam plate 50.

The above arrangement is duplicated and applied to both sides of the machine so that when the tray with its plaque arrives at the centring device, if the plaque driving rod 19 is projecting too much to one side it will be pushed inwards as it engages with the cam plate 50 in its corrected position. Over correction is prevented by the cam plate 50 on the opposite side of the machine which has been correspondingly set to give accurate centring.

The centring devices are provided where the loaded plaques are transferred from the table 1 to the trays, and also where the plaques are taken up by the trays adjacent the discharge end of the machine.

We claim:

1. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading, said plaques being subjected in an inverted condition to cleaning means prior to loading.

2. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading, said plaques having driving rods engaging in guide means and driven by dogs or traction chains, a portion of the guide means being pivotally mounted for adjusting the timing of the dogs.

3. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading, said plaques having driving rods, said stripping and discharging means including cam grooves at the discharge station and mutilated discs for driving said rods in said grooves, the completion of the unloading movement being effected by engagement of the rods by a tray.

4. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading, a table provided with displaceable parts to accommodate the passage of the plaques, said displaceable parts being controlled by cam means synchronised with the tray conveyor.

5. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading and wherein in at least one point in the travel of the loaded trays, automatic means adjusted by the passage of the trays are provided for centering the plaques laterally on the trays.

6. A machine for transporting sweetmeats, biscuits and other goods, comprising an endless tray conveyor having a plurality of trays movable through a circuit including loading and discharge stations, plaques supported face upward upon the trays throughout a portion of the circuit, means for stripping the plaques from the trays and discharging the goods from the plaques at the discharge station, means for returning the stripped plaques to the trays to be moved with the conveyor toward the loading station, means for again stripping the plaques from the trays prior to loading at said loading station, and means for returning the plaques to the trays after loading and wherein laterally adjustable cam plates are provided with which the plaques are adapted to engage, the cam plates being controlled by centering rails on the trays.

JOHN EDWARD POINTON.
ALLAN ASHMEAD TUNLEY.

REFERENCES CITED

The following references are of record in the file of this patent:

UNITED STATES PATENTS

| Number | Name | Date |
| --- | --- | --- |
| 1,672,522 | Greer et al. | June 5, 1928 |
| 1,732,228 | Greer et al. | Oct. 22, 1929 |
| 2,197,327 | Tunley et al. | Apr. 16, 1940 |
| 2,251,197 | Nestmann | July 29, 1941 |